Patented June 22, 1954

2,681,909

UNITED STATES PATENT OFFICE 2,681,909

2-BENZHYDRYLAMINOPYRIMIDINE

Lee Cannon Cheney, Fayetteville, N. Y., assignor to Bristol Laboratories, Inc., Syracuse, N. Y., a corporation of New York No Drawing. Application March 6, 1952,
Serial No. 275,237

3 Claims. (Cl. 260—256.4)

1

This invention relates to a new chemical compound of therapeutic value and more particularly to 2-benzhydrylaminopyrimidine.

There is now discovered according to the present invention the compound 2-benzhydrylaminopyrimidine and methods for its preparation.

The compound of the present invention is useful in medicine as a non-toxic analgesic and antipyretic agent. An indication of its lack of toxicity is furnished by the fact that the $LD_{50}$ I. P. in the mouse is greater than 1000 mgms./kg. $LD_{50}$ I. P. refers to the minimum dose on intraperitoneal injection which will kill fifty percent of a group of subjects.

The following example will serve to illustrate the invention without limiting it thereto.

Example

A mixture of 84.6 g. (0.34 mole) of benzohydryl bromide, 85 g. (0.89 mole) of 2-aminopyrimidine and 100 ml. of glacial acetic acid was gently warmed until solution was complete, tightly stoppered and allowed to stand at room temperature for 16 hours. The product was then refluxed for 7 hours and the resulting viscous red liquid was poured into 500 ml. of hot water. The white crystalline product obtained by cooling the mixture was collected by suction and dried; M. P. 139–143° C. Recrystallization from 95% alcohol yielded white crystals, M. P. 145–146° C. A portion was recrystallized from toluene without altering the melting point.

*Analysis.*—Calculated for $C_{17}H_{15}N_3$: C—78.3%; H—5.79%. Found: C—78.09% and 78.01%; H—5.82% and 5.70%.

In addition, this product may be prepared by forming the lithio derivative of 2-aminopyrimidine with lithium amide and reacting this lithio derivative with a benzhydryl halide. The product forms acid addition salts with strong organic and inorganic acids, such as sulfuric acid, hydrochloric acid, phosphoric acid, citric acid, hydrobromic acid and the like.

I claim:

1. A member selected from the group consisting of 2-benzhydrylaminopyrimidine and non-toxic, strong acid addition salts thereof.
2. Acid addition salts of 2-benzhydrylaminopyrimidine and strong, non-toxic acids.
3. 2-benzhydrylaminopyrimidine.

References Cited in the file of this patent

UNITED STATES PATENTS

| Number | Name | Date |
|---|---|---|
| 2,500,283 | Friedman et al. | Mar. 14, 1950 |

OTHER REFERENCES

Shriner and Fuson, Identification of Organic Compounds, John Wiley and Sons, 1940, page 41.